United States Patent
Chen et al.

(10) Patent No.: US 11,645,827 B2
(45) Date of Patent: May 9, 2023

(54) DETECTION METHOD AND DEVICE FOR ASSEMBLY BODY MULTI-VIEW CHANGE BASED ON FEATURE MATCHING

(71) Applicant: QINGDAO TECHNOLOGICAL UNIVERSITY, Shandong (CN)

(72) Inventors: Cheng Jun Chen, Shandong (CN); Yao Shuai Yue, Shandong (CN); Dong Nian Li, Shandong (CN); Jun Hong, Shandong (CN)

(73) Assignee: QINGDAO UNIVERSITY OF TECHNOLOGY, Shandong (CN)

( * ) Notice: Subject to any disclaimer, the term of this patent is extended or adjusted under 35 U.S.C. 154(b) by 106 days.

(21) Appl. No.: 17/345,122

(22) Filed: Jun. 11, 2021

(65) Prior Publication Data
US 2022/0358321 A1 Nov. 10, 2022

(30) Foreign Application Priority Data

May 10, 2021 (CN) .......................... 202110506029.7

(51) Int. Cl.
*G06T 7/00* (2017.01)
*G06F 18/23213* (2023.01)
*G06V 10/44* (2022.01)

(52) U.S. Cl.
CPC ...... *G06V 10/443* (2022.01); *G06F 18/23213* (2023.01); *G06T 7/0004* (2013.01)

(58) Field of Classification Search
CPC .. G06V 10/443; G06V 10/757; G06K 9/6223; G06T 7/0004; G06T 2207/30164; G06T 7/001; Y02P 90/30; G06F 18/23
USPC .......................................... 382/122, 100, 199
See application file for complete search history.

(56) References Cited

U.S. PATENT DOCUMENTS

| | | | | |
|---|---|---|---|---|
| 6,018,590 A | * | 1/2000 | Gaborski | G06V 10/25 382/209 |
| 10,185,898 B1 | * | 1/2019 | Folkens | G06Q 30/02 |
| 2013/0142442 A1 | * | 6/2013 | Metayer | G06V 10/245 382/218 |
| 2022/0207274 A1 | * | 6/2022 | Folkens | G06V 10/44 |

* cited by examiner

*Primary Examiner* — Sheela C Chawan
(74) *Attorney, Agent, or Firm* — McClure, Qualey & Rodack, LLP (57) ABSTRACT

The present invention relates to a detection method for an assembly body multi-view change based on feature matching, comprising the following steps: S1, acquiring a first image and a second image; S2, performing feature point extraction and feature matching on the first image and the second image to obtain a matching pair set, a first unmatched point set of the first image and a second unmatched point set of the second image; S3, acquiring a first to-be-matched area set of the first image according to the first unmatched point set; acquiring a second to-be-matched area set of the second image according to the second unmatched point set; S4, performing feature matching on each first unmatched area and each second unmatched area one by one to obtain a plurality of matching results; and S5, outputting the assembly body change type according to the plurality of matching results.

9 Claims, 6 Drawing Sheets

DETECTION METHOD AND DEVICE FOR ASSEMBLY BODY MULTI-VIEW CHANGE BASED ON FEATURE MATCHING

TECHNICAL FIELD

The present invention relates to a detection method and device for assembly body multi-view change based on feature matching, and falls in the field of image processing.

BACKGROUND

The assembly is an important production process for manufacturing products, and refers to a process for assembling and connecting mechanical components according to design requirements. With the continuous change of product types, the assembly difficulty also increases. In the assembly process of complex mechanical products, once errors (such as wrong assembling sequence, missing components, assembling mistakenly and the like) in the assembly process cannot be detected in time, the assembly efficiency and the service life of the mechanical products can be directly influenced. Therefore, the change state of the mechanical assembly body needs to be detected, and errors in the assembly process can be found in time.

In the prior art, for example, in patent publication No. CN109816049A, "an assembly monitoring method, device, and readable storage medium based on deep learning", a deep learning model is constructed and trained, the deep learning model outputs a pixel segmentation image of a physical assembly body, and the pixel segmentation image represents different components by pixel colors, so as to identify each component of the physical assembly body. The patent can identify each component of the assembly body, monitor the assembly steps and determine whether there is an assembly error when assembling each component or not and the type of assembly error. However, the deep learning model needs to collect a large amount of training sets and needs a large amount of training time, and has a large amount of calculation and high requirements on hardware of operating facilities.

In the prior art, for example, in patent publication No. CN106897995A, "an automatic component identification method for mechanical assembly process", features of components to be assembled in a component assembly sequence library and image features of component stacks in a scattered environment are matched and identified, so as to realize automatic component identification. The patent fails to recognize an assembly error and the type of assembly error in the assembly process.

SUMMARY OF THE INVENTION

In order to solve the problems in the prior art, the present invention provides a detection method for an assembly body multi-view change based on feature matching, determining the assembly body change type by identifying the change area in the images, and being able to find errors in the assembly process in time, thereby reducing the reject ratio of products and shortening the production period of the products.

The technical scheme of the present invention is as follows:

The first technical scheme is as follows:

A detection method for an assembly body multi-view change based on feature matching comprises the following steps:

S1, acquiring a first image and a second image, the first image being an image of the assembly at a previous moment, and the second image being an image of the assembly at a later moment;

S2, performing feature point extraction and feature matching on the first image and the second image to obtain a matching pair set, a first unmatched point set of the first image and a second unmatched point set of the second image;

S3, acquiring a first to-be-matched area set of the first image according to the first unmatched point set; acquiring a second to-be-matched area set of the second image according to the second unmatched point set; the to-be-matched area is an area formed by a plurality of similar unmatched points in the image;

S4, performing feature matching on each first unmatched area and each second unmatched area one by one to obtain a plurality of matching results; S5, outputting the assembly body change type according to the plurality of matching results.

Further, the step S2 is specifically:

respectively extracting characteristic points of the first image and the second image;

respectively extracting the distinctive areas of the first image and the second image;

matching the feature points in the first image distinctive area and the second image distinctive area according to the local gradient information of the feature points to obtain a matching pair set; filtering out mismatching pairs of the matching pair set by using a random sampling consistency algorithm;

the first unmatched point set comprising all feature points in the first image which do not belong to the matched pair set; the second set of unmatched points comprising all feature points in the second image that do not belong to the set of matched pairs.

Further, the step S3 is specifically:

performing cluster analysis on the first unmatched point sets to obtain a plurality of first unmatched point clusters; performing cluster analysis on the second unmatched point sets to obtain a plurality of second unmatched point clusters;

respectively acquiring cluster boundaries of each first unmatched point cluster and each second unmatched point cluster; segmenting the first image according to the cluster boundary of each first unmatched point cluster to obtain the first to-be-matched area set; and segmenting the second image according to the cluster boundary of each second unmatched point cluster to obtain the second to-be-matched area set.

Further, the specific steps of obtaining the cluster boundary are as follows:

selecting a plurality of boundary characteristic points of the unmatched point clusters by using a convex hull algorithm; and connecting the boundary characteristic points to obtain the cluster boundary of the unmatched point cluster.

Further, the step S3 further includes optimizing a cluster boundary:

presetting a first threshold value, calculating the area distinctiveness of each to-be-matched area, and if the area distinctiveness is greater than the first threshold value, keeping the cluster boundary of the to-be-matched area; otherwise, deleting the cluster boundary of the to-be-matched area and reselecting the cluster boundary by using a convex hull algorithm until the area distinctiveness of the to-be-matched area in the cluster boundary is greater than the first threshold value.

Further, the step S4 is specifically:

S41, selecting a certain second to-be-matched area from the second to-be-matched area set, respectively performing feature matching on the second to-be-matched area and each first to-be-matched area in the first to-be-matched area set, and calculating to obtain a plurality of matching degrees of the second to-be-matched area and each first to-be-matched area, if the maximum value of the plurality of matching degrees exceeds a second threshold value, the second to-be-matched area is considered to be matched with the first to-be-matched area corresponding to the maximum value of the matching degrees; otherwise, the second to-be-matched area is not matched with any first to-be-matched area.

And S42, repeating the step S41 until all the second to-be-matched areas complete feature matching.

Further, the calculation formula of the matching degree is as follows:

wherein, T represents the number of matching pairs between the first to-be-matched $$P = \frac{T}{\frac{1}{2}(A+B)}$$

area and the second to-be-matched area, A represents the number of feature points in the first to-be-matched area, and B represents the number of feature points in the second to-be-matched area.

Further, the step S5 is specifically:

if a certain second to-be-matched area is not matched with any first to-be-matched area, the assembly component in the second to-be-matched area is represented as a newly added component;

if a certain first to-be-matched area is not matched with any second to-be-matched area, the assembly component in the first to-be-matched area is a reduced component;

if a certain first to-be-matched area is matched with a certain second to-be-matched area, indicating that the assembly component in the first to-be-matched area is same as that in the second to-be-matched area, and the assembly component is a moving component.

The second technical scheme is as follows:

a detection method for an assembly body multi-view change based on feature matching comprising a memory and a processor, the memory storing instructions adapted to be loaded by the processor and execute the following steps:

S1, acquiring a first image and a second image, the first image being an image of the assembly at a previous moment, and the second image being an image of the assembly at a later moment;

S2, performing feature point extraction and feature matching on the first image and the second image to obtain a matching pair set, a first unmatched point set of the first image and a second unmatched point set of the second image;

S3, acquiring a first to-be-matched area set of the first image according to the first unmatched point set; acquiring a second to-be-matched area set of the second image according to the second unmatched point set; the to-be-matched area is an area formed by a plurality of similar unmatched points in the image;

S4, performing feature matching on each first unmatched area and each second unmatched area one by one to obtain a plurality of matching results; S5, outputting the assembly body change type according to the plurality of matching results.

The invention has the following beneficial effects:

1. The present invention obtains the images of the assembly body in different assembly processes under different visual angles, determines the assembly body change type by identifying the change area (namely the to-be-matched area) in the images and can find errors in the assembly process in time, thereby reducing the reject ratio of products and shortening the production period of the products.

2. The present invention perform characteristic point extraction and the characteristic matching on the assembly body images under different visual angles to obtain the to-be-matched areas, the identification of the assembly error types is realized by performing the characteristic matching on the to-be-matched areas, the addition, the reduce and the movement of a component can be accurately determined, the required calculation amount and time are both less than those of a deep learning method (multiple convolution calculations needing to be carried out in the deep learning method), the real-time performance is high, the types of the change areas can be accurately identified, and the positions of the change areas in the images can be determined. And only the characteristic matching of the characteristic points in the distinctive area can effectively reduce the interference of the image background to the image matching and improve the matching accuracy.

3. According to the method in the present invention, the over-segmentation condition is effectively reduced, and the identification precision of the change area is improved by optimizing the cluster boundary by using calculating the area significance.

DETAILED DESCRIPTION OF THE INVENTION

The present invention is described in detail below with reference to the figures and the specific embodiments.

Embodiment 1

A detection method for an assembly body multi-view change based on feature matching comprises the following steps:

S1, acquiring a first image and a second image, the first image being an image of the assembly at a previous moment, and the second image being an image of the assembly at a later moment. In this embodiment, the imaging angles of the assembly in the first image and the second image are different (i.e., the angles between the camera and the assembly are different).

S2, extracting and matching the feature points of the first image and the second image by using a Scale Invariant Feature Transform (SIFT) algorithm to obtain a matching pair set, a first unmatched point set of the first image and a second unmatched point set of the second image, the unmatched points being feature points in the images which are not matched with feature points of another image, and this step specifically comprising the following steps:

S21, respectively extracting the characteristic points of the first image and the second image;

S22, respectively extracting the distinctive areas of the first image and the second image;

S23, matching the feature points in the first image distinctive area and the second image distinctive area according to the local gradient information of the feature points to obtain a matching pair set;

S24, filtering mismatching pairs of the matching pair set (the matching pair set represents an unchanged area in the first image and the second image) by using a random sample consensus (RANSAC) algorithm; all feature points in the first image which do not belong to the matching pair set form a first mismatching point set; and all the feature points in the second image which do not belong to the second matching pair set form a second unmatched point set.

S3, acquiring a first to-be-matched area set of the first image according to the first unmatched point set. And acquiring a second to-be-matched area set of the second image according to the second unmatched point set. The to-be-matched area is an area formed by a plurality of similar unmatched points in the image.

S4, performing feature matching on the first unmatched areas and the second unmatched areas one by one to obtain a plurality of matching results. Feature matching is performed directly using the feature points (including matching pairs and unmatching points) obtained in step S2. If the unmatched area is obtained by dividing the image, the coordinate positions of the feature points in the unmatched area are changed, so that two unmatched points (e.g., feature points of a moving component) that do not form a matching pair in step S3 may also form a matching pair in step S4.

S5, outputting the assembly body change types according to the plurality of matching results:

if a certain second to-be-matched area is not matched with any first to-be-matched area, the assembly component in the second to-be-matched area is represented as a newly added component;

if a certain first to-be-matched area is not matched with any second to-be-matched area, the assembly component in the first to-be-matched area is a reduced component;

if a certain first to-be-matched area is matched with a certain second to-be-matched area, indicating that the assembly component in the first to-be-matched area is same as that in the second to-be-matched area, and the assembly component is a moving component.

The beneficial effect of this embodiment lies in:

To obtain images of an assembly body in different assembly processes under different visual angles, determine the assembly body change type by identifying the change area (namely the to-be-matched area) in the images, errors in the assembly process can be find in time, so as to reduce the reject ratio of products and shorten the production period of the products.

By using the SIFT algorithm to perform feature point extraction and feature matching on the assembly body images under different visual angles to obtain the to-be-matched areas, and realizing the identification of assembly error types by performing feature matching on the to-be-matched areas, the addition, reduce and movement of components can be accurately determined, the required calculation amount and time are both smaller than those of a deep learning method (multiple convolution calculation needing to be carried out in the deep learning method), the real-time performance is high, the types of the change areas can be accurately identified, and the positions of the change areas in the images can be determined. And only the characteristic matching of the characteristic points in the distinctive area can effectively reduce the interference of the image background to the image matching and improve the matching accuracy.

Embodiment 2

Further, the step S3 is specifically:

Performing clustering analysis on the first unmatched point sets by using a K-Means clustering algorithm (K-Means algorithm) or other clustering algorithms, and dividing similar unmatched points into the same cluster to obtain a plurality of first unmatched point clusters; and performing cluster analysis on the second unmatched point sets, and dividing similar unmatched points into the same cluster to obtain a plurality of second unmatched point clusters.

For example, K unmatched points in the first unmatched point set are randomly selected as centroids, and the euclidean distances from the unmatched points in the first unmatched point set to the centroids are calculated. The smaller the euclidean distance is, the higher the similarity between the mismatch point and the centroid is. Each unmatched point sequentially is divided to the cluster where the centroid with the minimum Euclidean distance is located, and the centroid of the cluster where the unmatched point is located is updated to be the average value of all unmatched points of the cluster. If the error of the centroid is not in the allowable range after all the unmatched points are divided, the K unmatched points are reselected as the centroids, and clustering analysis is carried out again until the error of the centroid is in the allowable range after all the unmatched points are divided.

Selecting a plurality of boundary characteristic points of the unmatched point clusters by using a convex hull algorithm; and connecting the boundary characteristic points to obtain the cluster boundary of the unmatched point cluster. This step is repeated until cluster boundaries for all unmatched point clusters are obtained. The cluster boundary surrounding area is a to-be-matched area.

Presetting a first threshold (in this embodiment, the first threshold is set to be 0.6), calculating the area distinctiveness of each to-be-matched area, and if the area distinctiveness is greater than the first threshold, keeping a cluster boundary of the to-be-matched area; otherwise, deleting the cluster boundary and reselecting the cluster boundary by using a convex hull algorithm until the area distinctiveness is greater than the first threshold value. The calculation formula of the area significance is as follows:

$$s_r = \tfrac{1}{3}(\omega_\sigma s_\sigma + \omega_\pi s_\pi + \omega_\beta s_\beta).$$

wherein, $S_\sigma$ represents the ratio of the area size to the image size, and $S_\pi$ represents the protruding degree of the area; $S_\beta$ represents the intensity of the cluster boundary corresponding to the area; $\omega_\sigma$, $\omega_\pi$ and $\omega_\beta$ each represent weights, and $\omega_\sigma + \omega_\pi + \omega_\beta = 1$.

Segmenting the first image according to the cluster boundary of each first unmatched point cluster to obtain the first to-be-matched area set; and segmenting the second image according to the cluster boundary of each second unmatched point cluster to obtain the second to-be-matched area set. This embodiment has the advantages that the over-segmentation condition is effectively reduced, and the identification precision of the change area is improved, due to optimize the cluster boundary by calculating the area significance.

Embodiment 3

It is assumed that the first to-be-matched area set including M first to-be-matched areas and the second to-be-matched area set including N second to-be-matched areas are acquired in step S3.

Figure 10:
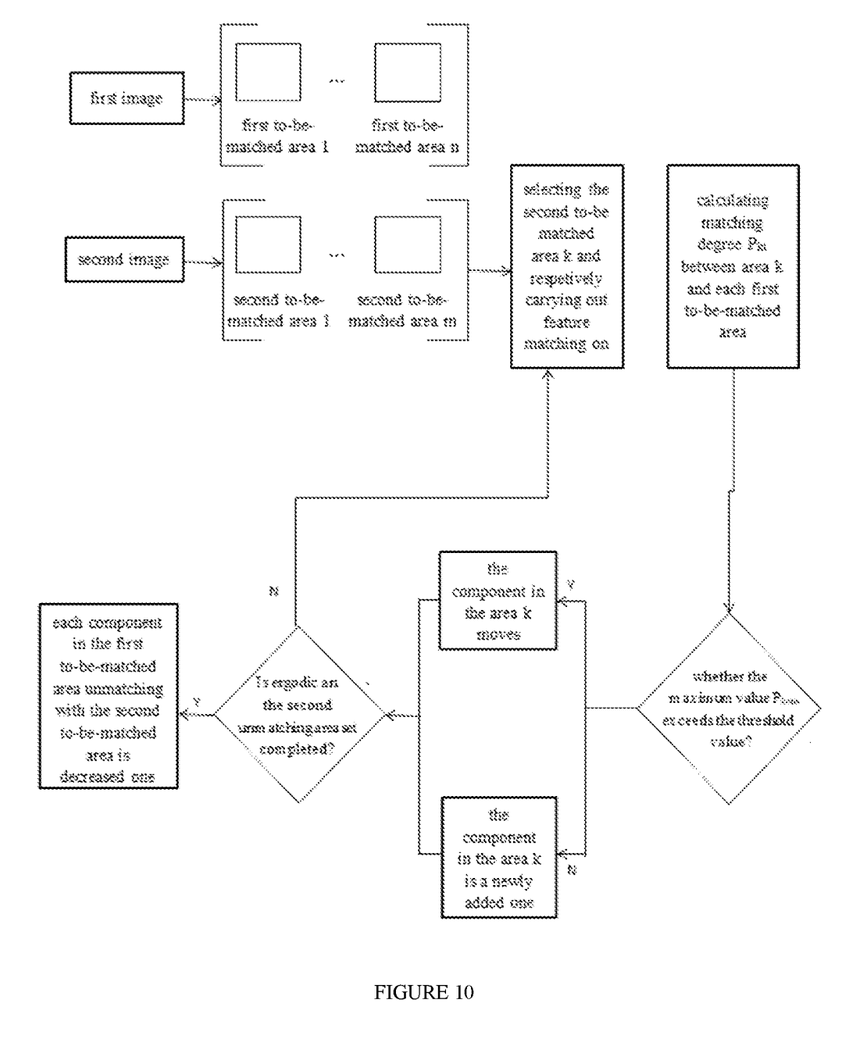
FIG. 10 is a flow chart of embodiment 3.

Referring to FIG. 10, the step S4 specifically includes:

S41, selecting an area k in the second to-be-matched area set; and respectively performing feature matching on the area k and n first to-be-matched areas, and calculating the matching degree P:

$$P = \frac{T}{\frac{1}{2}(A+B)}$$

wherein, T represents the number of matching pairs between the first to-be-matched area and the second to-be-matched area, A represents the number of feature points in the first to-be-matched area, and B represents the number of feature points in the second to-be-matched area. The larger the value of P is, the larger the number of matching pairs between the first to-be-matched area and the second to-be-matched area is, and the higher the similarity is.

If the maximum value $P_{kmax}$ of the matching degrees exceeds a second threshold value (in this embodiment, the second threshold value is 0.8), it is considered that the area k matches the first to-be-matched area corresponding to the maximum value of the matching degrees, which indicates that the component in the area k moves; otherwise, the area k is not matched with any first to-be-matched area, which indicates that the component in the area k is newly added.

S42, repeating the step S41 until all the second to-be-matched areas complete feature matching, and obtaining the matching result of each first unmatched area and each second unmatched area.

Embodiment 4

Figure 1:
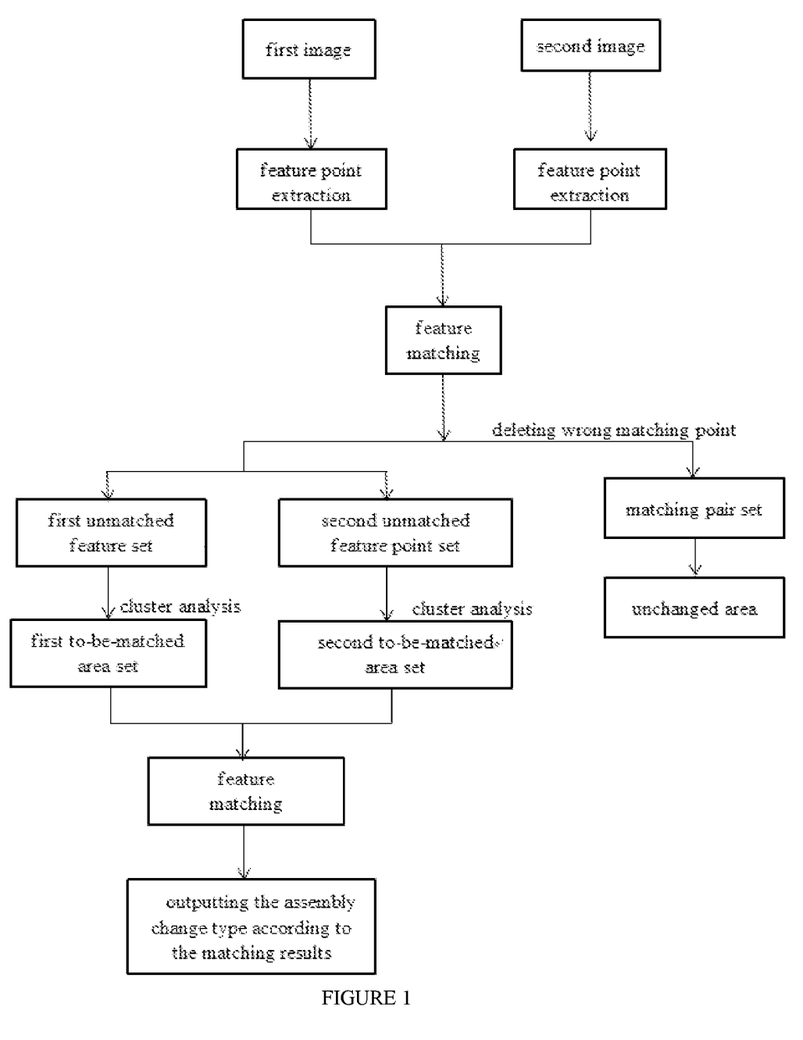
FIG. 1 is a flow chart of the present invention.
Figure 2:
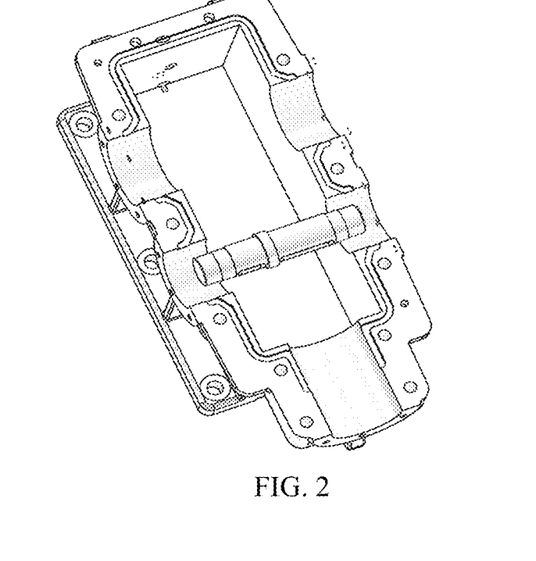
FIG. 2 is a schematic diagram of the first image.
Figure 3:
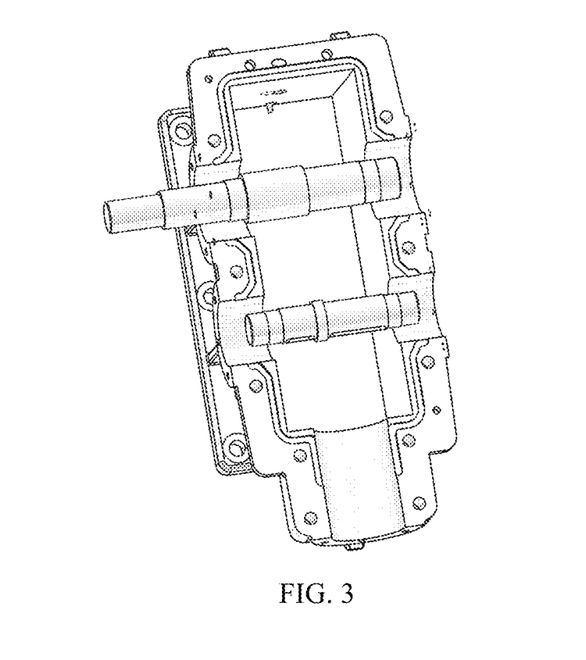
FIG. 3 is a schematic diagram of the second image.
Figure 4:
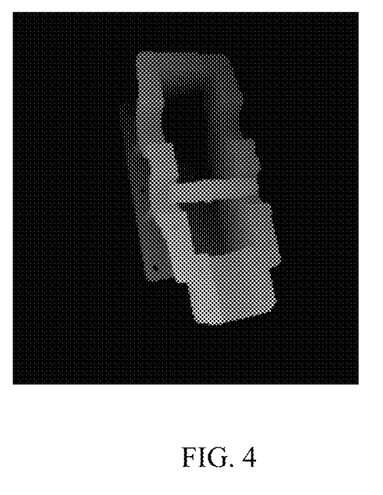
FIG. 4 is an exemplary illustration of the first image.
Figure 5:
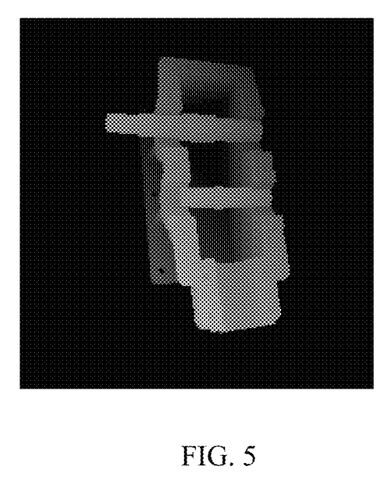
FIG. 5 is an exemplary diagram of the second image.

S1, constructing a three-dimensional model of the mechanical assembly body, loading the three-dimensional model of the mechanical assembly body into depth image imaging software, and setting a virtual camera to shoot the assembly in different assembly states (such as FIGS. 2 and 3) to obtain a first image (such as FIG. 4) and a second image (such as FIG. 5). FIG. 4 is an image of the assembly at a previous moment, and FIG. 5 is an image of the assembly at a subsequent moment.

Figure 6:
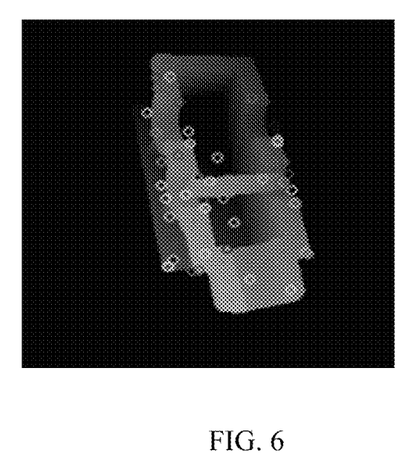
FIG. 6 is a schematic diagram of the extracted feature points in FIG. 3.
Figure 7:
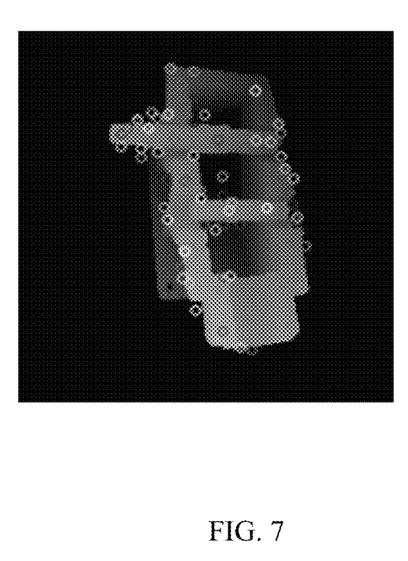
FIG. 7 is a schematic diagram of the extracted feature points in FIG. 5.

S2, extracting and matching the characteristic points of the first image and the second image to obtain a matching pair set, a first unmatched point set and a second unmatched point set. The feature points of the first image are shown in FIG. 6; the feature points of the second image are shown in FIG. 7.

S3, acquiring a first to-be-matched area set and a second to-be-matched area set according to the first unmatched point set and the second unmatched point set, the to-be-matched areas being areas formed by a plurality of similar unmatched points in the image. In this embodiment, one first to-be-matched area (the position of the first to-be-matched area is the position indicated by the block 101 in FIG. 8) and one second to-be-matched area (the position of the second to-be-matched area is the position indicated by the block 102 in FIG. 9) are obtained.

Figure 8:
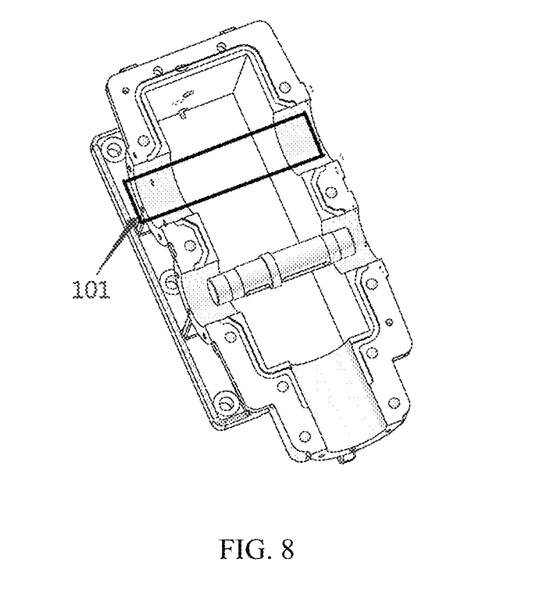
FIG. 8 is a schematic diagram of a position of a first to-be-matched area.
Figure 9:
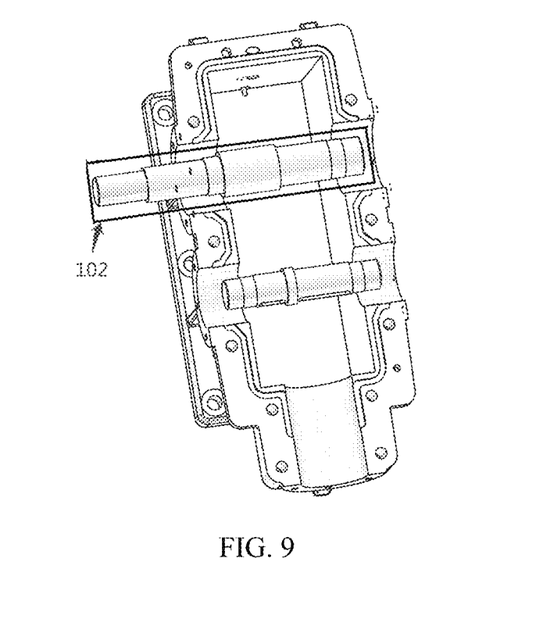
FIG. 9 is a schematic diagram of a position of a second to-be-matched area.

S4, performing feature matching on the first unmatched area and the second unmatched area, and outputting the assembly body change type as a newly added component in the assembly if the matching result is that the first unmatched area is not matched with the second unmatched area, the newly added component is located in the second unmatched area.

Embodiment 5

A detection device for an assembly body multi-view change based on feature matching, comprising a memory and a processor, the memory storing instructions adapted to be loaded by the processor and execute the following steps:

S1, acquiring a first image and a second image, the first image being an image of the assembly at a previous moment, and the second image being an image of the assembly at a later moment;

S2, performing feature point extraction and feature matching on the first image and the second image to obtain a matching pair set, a first unmatched point set of the first image and a second unmatched point set of the second image;

S3, acquiring a first to-be-matched area set of the first image according to the first unmatched point set; acquiring a second to-be-matched area set of the second image according to the second unmatched point set; the to-be-matched area is an area formed by a plurality of similar unmatched points in the image;

S4, performing feature matching on each first unmatched area and each second unmatched area one by one to obtain a plurality of matching results; S5, outputting the assembly body change type according to the plurality of matching results.

The above description is only the embodiments of the present invention, and is not intended to limit the scope of the present invention, and all equivalent structures or equivalent processes changes performed by the present invention or directly or indirectly applied to other related technical fields are included in the scope of the present invention.

The invention claimed is:

1. A detection method for an assembly body multi-view change based on feature matching, characterized by comprising the following steps:

S1, acquiring a first image and a second image, the first image being an image of the assembly at a previous moment, and the second image being an image of the assembly at a later moment;

S2, performing feature point extraction and feature matching on the first image and the second image to obtain a matching pair set, a first unmatched point set of the first image and a second unmatched point set of the second image;

S3, acquiring a first to-be-matched area set of the first image according to the first unmatched point set; acquiring a second to-be-matched area set of the second image according to the second unmatched point set; the to-be-matched area being an area formed by a plurality of similar unmatched points in the image;

S4, performing feature matching on each first unmatched area and each second unmatched area one by one to obtain a plurality of matching results; and S5, outputting the assembly body change type according to the plurality of matching results.

2. A detection method for an assembly body multi-view change based on feature matching as claimed in claim 1, characterized in that the step S2 is specifically:

respectively extracting characteristic points of the first image and the second image;

respectively extracting the distinctive areas of the first image and the second image;

matching the feature points in the first image distinctive area and the second image distinctive area to obtain a matching pair set; filtering out mismatching pairs of the matching pair set by using a random sampling consistency algorithm;

the first unmatched point set comprising all feature points in the first image that do not belong to the matched pair set; the second set of unmatched points comprising all feature points in the second image that do not belong to the matched pairs set.

3. A detection method for an assembly body multi-view change based on feature matching as claimed in claim 2, characterized in that the step S3 is specifically:

performing cluster analysis on the first unmatched point sets to obtain a plurality of first unmatched point clusters; performing cluster analysis on the second unmatched point sets to obtain a plurality of second unmatched point clusters;

respectively acquiring cluster boundaries of each first unmatched point cluster and each second unmatched point cluster; segmenting the first image according to the cluster boundary of each first unmatched point cluster to obtain the first to-be-matched area set; and segmenting the second image according to the cluster boundary of each second unmatched point cluster to obtain the second to-be-matched area set.

4. A detection method for an assembly body multi-view change based on feature matching as claimed in claim 3, characterized in that the specific steps of obtaining the cluster boundary are:

selecting a plurality of boundary characteristic points in the first unmatched point cluster or the second unmatched point cluster by using a convex hull algorithm; and connecting the boundary characteristic points to obtain the cluster boundary of the first unmatched point cluster or the second unmatched point cluster.

5. A detection method for an assembly body multi-view change based on feature matching as claimed in claim 3, characterized in that the step S3 further comprises optimizing the cluster boundary:

presetting a first threshold value, calculating the area distinctiveness of the first to-be-matched area or the second to-be-matched area, and if the area distinctiveness is greater than the first threshold value, keeping a cluster boundary of the first to-be-matched area or the second to-be-matched area; otherwise, deleting the cluster boundary of the first to-be-matched area or the second to-be-matched area and reselecting the cluster boundary by using a convex hull algorithm until the distinctiveness of the areas is greater than the first threshold value.

6. A detection method for an assembly body multi-view change based on feature matching as claimed in claim 1, characterized in that the step S4 is specifically:

S41, selecting a certain second to-be-matched area from the second to-be-matched area set, respectively performing feature matching on the second to-be-matched area and each first to-be-matched area in the first to-be-matched area set, and calculating to obtain a plurality of matching degrees of the second to-be-matched area and each first to-be-matched area, if the maximum value of the plurality of matching degrees exceeds the second threshold value, the second to-be-matched area considered to be matched with the first to-be-matched area corresponding to the maximum value of the matching degrees; otherwise, the second to-be-matched area considered not to be matched with any first to-be-matched area;

and S42, repeating the step S41 until all the second to-be-matched areas complete feature matching.

7. A detection method for an assembly body multi-view change based on feature matching as claimed in claim 6, characterized in that the calculation formula of the matching degree P is:

$$P = \frac{T}{\frac{1}{2}(A+B)}$$

wherein, T represents the number of matching pairs between the first to-be-matched area and the second to-be-matched area, A represents the number of feature points in the first to-be-matched area, and B represents the number of feature points in the second to-be-matched area.

8. A detection method for an assembly body multi-view change based on feature matching as claimed in claim 1, characterized in that the step S5 is specifically:

in response to a certain second to-be-matched area is not matched with any first to-be-matched area, the assembly component in the second to-be-matched area is represented as a newly added component;

in response to a certain first to-be-matched area is not matched with any second to-be-matched area, the assembly component in the first to-be-matched area is represented as a reduced component;

in response to a certain first to-be-matched area is matched with a certain second to-be-matched area, indicating that the assembly component in the first to-be-matched area is same as that in the second to-be-matched area, and the assembly component is a moving component.

9. A detection device for assembly body multi-view change based on feature matching, characterized by comprising a memory and a processor, the memory storing instructions adapted to be loaded by the processor and execute the following steps:

S1, acquiring a first image and a second image, the first image being an image of the assembly at a previous moment, and the second image being an image of the assembly at a later moment;

S2, performing feature point extraction and feature matching on the first image and the second image to obtain a matching pair set, a first unmatched point set of the first image and a second unmatched point set of the second image;

S3, acquiring a first to-be-matched area set of the first image according to the first unmatched point set; acquiring a second to-be-matched area set of a second image according to the second unmatched point set; the to-be-matched area is an area formed by a plurality of similar unmatched points in the image;

S4, performing feature matching on each first unmatched area and each second unmatched area one by one to obtain a plurality of matching results; and S5, outputting the assembly body change type according to the plurality of matching results.

* * * * *